(12) United States Patent
Palen (10) Patent No.: US 8,336,639 B2
(45) Date of Patent: Dec. 25, 2012

(54) IMPLEMENT TONGUE LOCKING MECHANISM

(75) Inventor: Nelson J. Palen, Beloit, KS (US)

(73) Assignee: AGCO Corporation, Duluth, GA (US)

( * ) Notice: Subject to any disclaimer, the term of this patent is extended or adjusted under 35 U.S.C. 154(b) by 260 days.

(21) Appl. No.: 12/939,242

(22) Filed: Nov. 4, 2010

(65) Prior Publication Data

US 2012/0111584 A1 May 10, 2012

(51) Int. Cl.
*A01B 59/00* (2006.01)
(52) U.S. Cl. ......... 172/328; 172/396; 172/452; 172/467
(58) Field of Classification Search .................. 172/322, 172/324, 327, 328, 395, 396, 452, 458, 467, 172/470, 481, 605, 662, 674, 677–680
See application file for complete search history.

(56) References Cited

U.S. PATENT DOCUMENTS

| | | | | |
|---|---|---|---|---|
| 3,321,029 A | * | 5/1967 | Morkoski et al. | 172/328 |
| 3,912,017 A | * | 10/1975 | Rehn | 172/328 |
| 3,912,018 A | * | 10/1975 | Brundage et al. | 172/328 |
| 4,106,568 A | * | 8/1978 | Cline | 172/327 |
| 4,306,732 A | * | 12/1981 | Pettibone | 280/43.23 |
| 4,308,920 A | * | 1/1982 | Floyd et al. | 172/328 |
| 4,373,591 A | * | 2/1983 | Schaaf et al. | 172/328 |
| 4,428,435 A | * | 1/1984 | Hubbard et al. | 172/328 |
| 4,712,622 A | * | 12/1987 | Birkenbach et al. | 172/328 |
| 5,167,286 A | * | 12/1992 | Bossler | 172/414 |
| 5,590,721 A | * | 1/1997 | Van Mill | 172/138 |
| 5,855,245 A | * | 1/1999 | Gerein | 172/328 |
| 5,992,535 A | * | 11/1999 | Bierl et al. | 172/328 |
| 6,035,943 A | * | 3/2000 | Gerein et al. | 172/328 |
| 6,125,775 A | * | 10/2000 | Gust | 111/52 |
| 6,679,339 B1 | * | 1/2004 | Steinlage et al. | 172/395 |
| 7,063,167 B1 | * | 6/2006 | Staszak et al. | 172/328 |
| 8,235,130 B2 | * | 8/2012 | Henry et al. | 172/4 |
| 2002/0074139 A1 | * | 6/2002 | Ankenman | 172/452 |

* cited by examiner

*Primary Examiner* — Jamie L McGowan (57) ABSTRACT

A tongue-hitch structure for a pull-type implement may comprise a tongue locking mechanism. A work frame for the pull-type implement may comprise a vertically adjustable rear wheel suspension comprising an actuator for moving the work frame between a lowered, working position and a raised, transport position. The tongue-hitch structure may be adapted to allow vertical movement between the tongue-hitch structure and the work frame. A leveling arrangement may be coupled between the work frame and the hitch-tongue structure operable to prevent and/or allow vertical movement between the tongue-hitch structure and the work frame.

20 Claims, 9 Drawing Sheets

IMPLEMENT TONGUE LOCKING MECHANISM

BACKGROUND

In conventional implements, a lift mechanism may be used to switch the implement from a lowered, working position to a raised, transport position. However, such implements comprise large, rigid frames that may be unable to follow a ground contour, particularly when the towing vehicle and implement are on different heights and/or angles. For some implements, this may result in inefficient or low quality work, such as uneven ground penetration by a cultivator.

SUMMARY

A pull-type implement with a tractor hitch adapted for attachment to a tractor may be provided. The pull-type implement may comprise a floating tongue, a tractor mount, a self-leveling mechanism, and a work frame (i.e., a main body). A tongue-hitch structure for a pull-type implement may comprise a tongue locking mechanism. A work frame for the pull-type implement may comprise a vertically adjustable rear wheel suspension comprising an actuator for moving the work frame between a lowered, working position and a raised, transport position. The tongue-hitch structure may be adapted to allow vertical movement between the tongue-hitch structure and the work frame. A leveling arrangement may be coupled between the work frame and the hitch-tongue structure operable to prevent and/or allow vertical movement between the tongue-hitch structure and the work frame.

The foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A farm implement pulled by a towing vehicle (e.g. a tractor) may be used to work a field. Consistent with embodiments of the invention, a floating, self-leveling tongue may be provided that may allow a floating (e.g. terrain following) capability for the farm implement. The floating capability may be permitted while the implement is in a lowered, working position, but removed when the implement is in a raised, transport position. In order to provide this floating capability, the implement may include an actuator that may be contracted into a locked position for the tongue to enter a transport mode and expanded into an unlocked (e.g. working) position for the tongue to enter a floating mode. Consequently, in the floating mode, the farm implement may be able to follow a ground contour, particularly when the towing vehicle and implement are on different heights and/or angles. Accordingly, efficient, higher quality work may be performed when working uneven ground for example.

A pull-type implement with a tractor hitch (e.g., a swivel drawbar hitch), adapted for use (e.g., attachment) with a tractor, may be provided. The pull-type implement may comprise a floating tongue, a tractor mount, a self-leveling mechanism, and a work frame (i.e., a main body). Consistent with embodiments of the invention, the pull-type implement may be operable to be moved between a lowered, working position and a raised, transport position. The floating capability of the tongue may be locked when the implement is raised for ease of turning, positioning, and/or transporting. The floating tongue may further comprise a leveling arrangement to maintain the implement frame in a substantially level position during operation, transport, and/or while being moved between positions.

A hydraulic cylinder, for example, may be used to lock the leveling arrangement and achieve a self-leveling mode. The hydraulic cylinder may be unlocked to achieve the floating mode. The leveling arrangement may comprise two levers, one situated substantially within the other, that may pivot about a common pivot axis independently of each other. The hydraulic cylinder may be arranged about the inner lever and may comprise locking pins at the rod end and at a trunnion of the cylinder end. The locking pins may be arranged for mating with radial slots in the outer lever to provide a limited range of motion for the floating mode. The range of motion may comprise, for example, +/−11 degrees.

Figure 1:
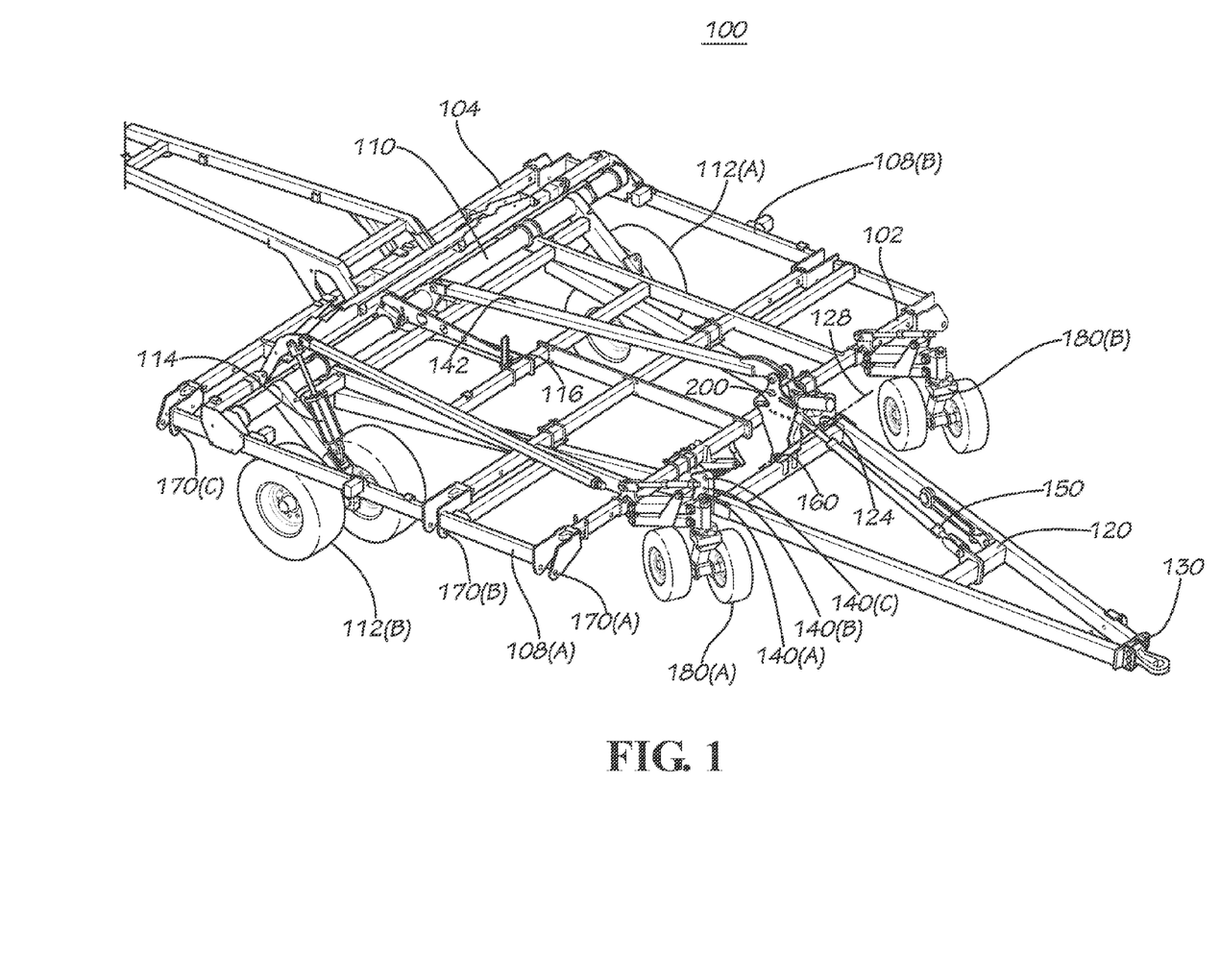
FIG. 1 is a perspective view of an embodiment of a pull-type implement.

FIG. 1 is a perspective view of a pull-type work implement 100. Implement 100 may comprise a frame comprising a front cross-member 102, a rear cross-member 104 positioned substantially parallel to front cross-member 102, and a plurality of frame rails 108(A)-(B) joining front cross-member 102 to rear cross-member 104. The frame of implement 100 may comprise a plurality of other members to provide structural support as needed for a work operation. For example, the frame may support a plurality of cultivating tiller blades. The blades may engage the ground while the implement is in a lowered, working position and may be raised out of contact with the ground while the implement is in a raised, transport position.

Figure 5:
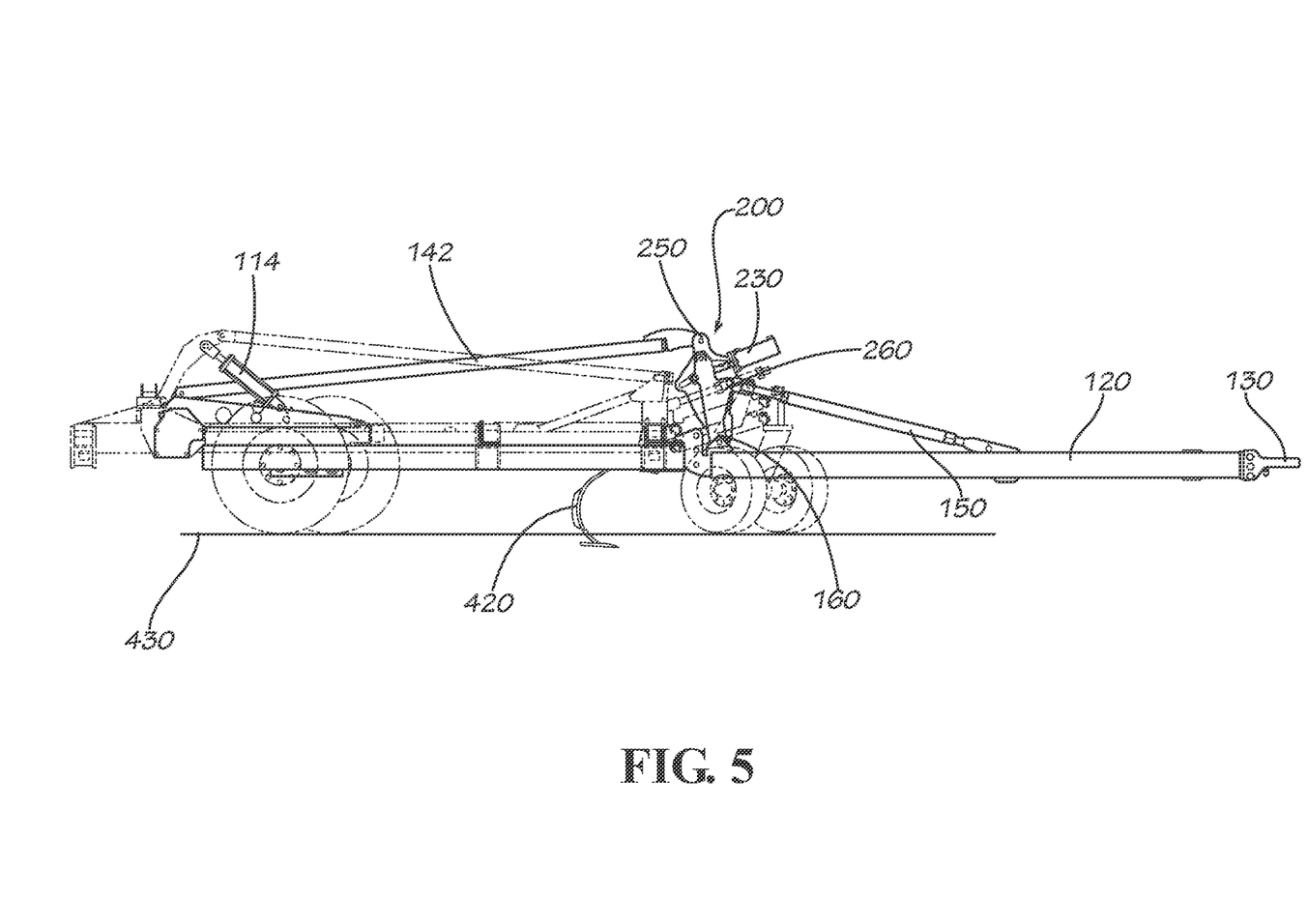
FIG. 5 is a left side elevation view of the pull-type implement of FIG. 1 in a lowered, working position with the leveling arrangement of FIG. 3 in the floating mode.
Figure 6:
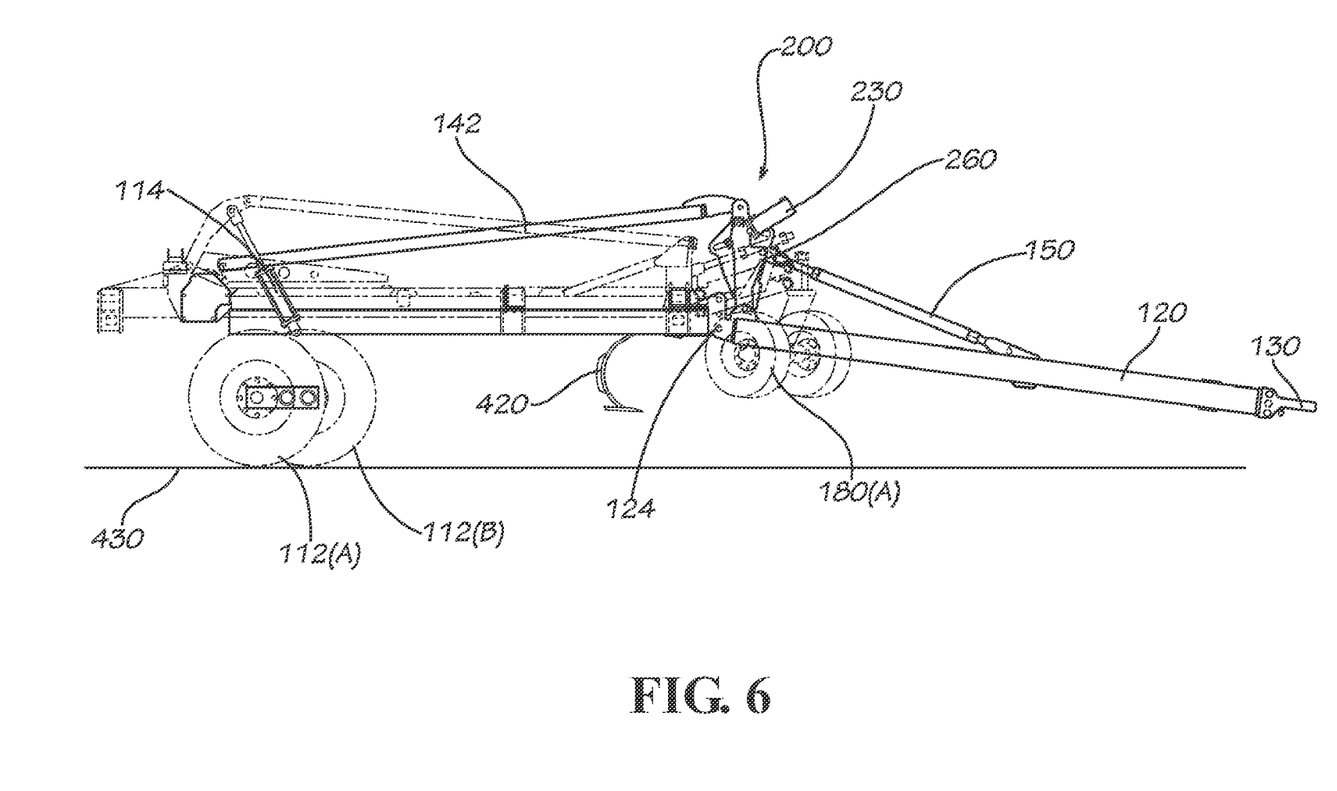
FIG. 6 is a left side elevation view of the pull-type implement of FIG. 1 in a raised, transport position with the leveling arrangement of FIG. 3 in the locked mode.
Figure 7:
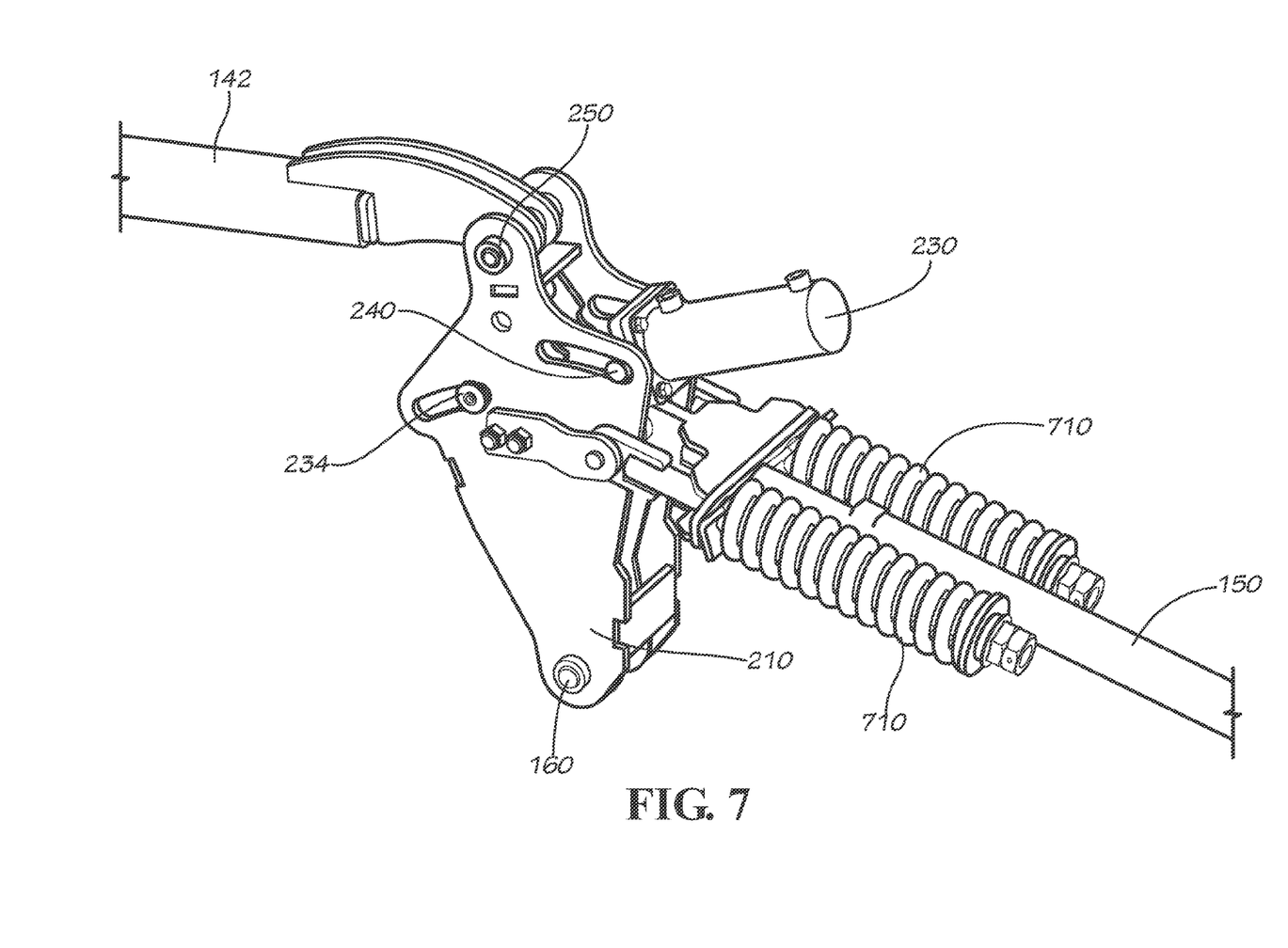
FIG. 7 is a perspective view of the leveling arrangement of FIG. 3 coupled to a pair of counterbalancing springs.

Implement 100 may further comprise a vertically adjustable rear wheel suspension rotatably mounted to the frame rails 108(A)-(B) of the frame comprising a lift axle assembly 110 and at least two laterally spaced ground-engaging wheels 112(A)-(B) rotatably mounted to lift axle assembly 110. The vertically adjustable rear wheel suspension may further comprise at least one actuator 114 operably connected to the lift axle assembly 110, such as a hydraulic cylinder. Actuator 114 may comprise a hydraulic depth control valve that may contract a plunger on a valve, and stop at an adjustable work depth. For example, actuator 114 may be set to lower a tiller blade attached to the frame of implement 100 to a depth of six inches. The work depth may be indicated by a depth gauge 116. Actuator 114 may actuate the vertically adjustable rear wheel suspension and thereby move the frame between a lowered, working position, as illustrated in FIGS. 5 and 6 and described below, and a raised, transport position, as illustrated in FIG. 7 and described below.

A tongue 120 may be coupled to front cross-member 102 via at least one first pivot joint 124. First pivot joint 124 may be operative to allow vertical movement between the tongue and the frame of implement 100 about a first pivot axis 128 according to changes in the ground's terrain level. Pivot joint 124 may comprise one of a plurality of selectable attachment points 140(A)-(C) available on the frame of implement 100. The selection of an attachment point may be made in order to ensure that the frame remains substantially level. Each of attachment points 140(A)-(C) may be suitable for balancing heavier or lighter work tools attached to the frame.

A leveling linkage 142 may be coupled between lift axle assembly 110 and a leveling arrangement 200 coupled to tongue 120, as described below in greater detail with respect to FIG. 2 and FIG. 3. Leveling arrangement 200 may be coupled to front cross-member 102 and/or tongue 120 at a second pivot joint 160. Leveling linkage 140 may be operable to maintain the frame in a substantially level orientation when the frame is being moved between the lowered, working position and the raised, transport position. Implement 100 may further comprise a hitch 130 at a front end of tongue 120 for coupling tongue 120 to a towing vehicle, such as a tractor.

Leveling arrangement 200 may be further coupled to tongue 120 via an adjustable link 150 that may be operative to transfer motion between leveling arrangement 200 and tongue 120. A threaded adjustment of adjustable link 150 may be operative to allow the implement to be used with different tractors of varying drawbar height.

Implement 100 may further comprise a plurality of attachment points 170(A)-(C) on frame rails 108(A)-(B). Attachment points 170(A)-(C) may be operative to couple at least one work element wing 810(A)-(D) to the frame of implement 100. Work element wings 810(A)-(D) are described in greater detail below with respect to FIG. 8.

Implement 100 may further comprise at least one front gauge wheel assembly 180(A). Front gauge wheel assembly 180(A) and/or a second front gauge wheel assembly 180(B) may be operative to engage the ground when the frame is in the lowered, working position may be maintained out of contact with the ground when the frame is in the raised, transport position. Gauge wheel assemblies 180(A)-(B) may each be mounted to front cross-member 102 at substantially equal distances from a respective joining of frame rails 108 (A)-(B) to front cross-member 102. For example, gauge wheel assembly 180(A) may be mounted to front cross-member 102 at a distance of one foot from a joining of front cross-member 102 to frame rail 108(A) and gauge wheel assembly 180(B) may be mounted to front cross-member 102 at the same distance of one foot from a joining of front cross-member 4102 to frame rail 108(B).

While in the lowered, working position, gauge wheel assemblies 180(A)-(B) may maintain contact with the ground to maintain a constant work depth. The depth of gauge wheel assemblies 180(A)-(B) may be adjustable. Further, the coupling of tongue 120 to the frame of implement 100 may also be adjusted to aid in balancing the contact with the ground. For example, where weight has been added to the rear of implement 100, tongue 120 may be attached in a top attachment point 140(C) in order to raise the line of draft and maintain contact of gauge wheel assemblies 180(A)-(C) when going though a depression in a field's terrain and tongue 120 is floating up.

Figure 2:
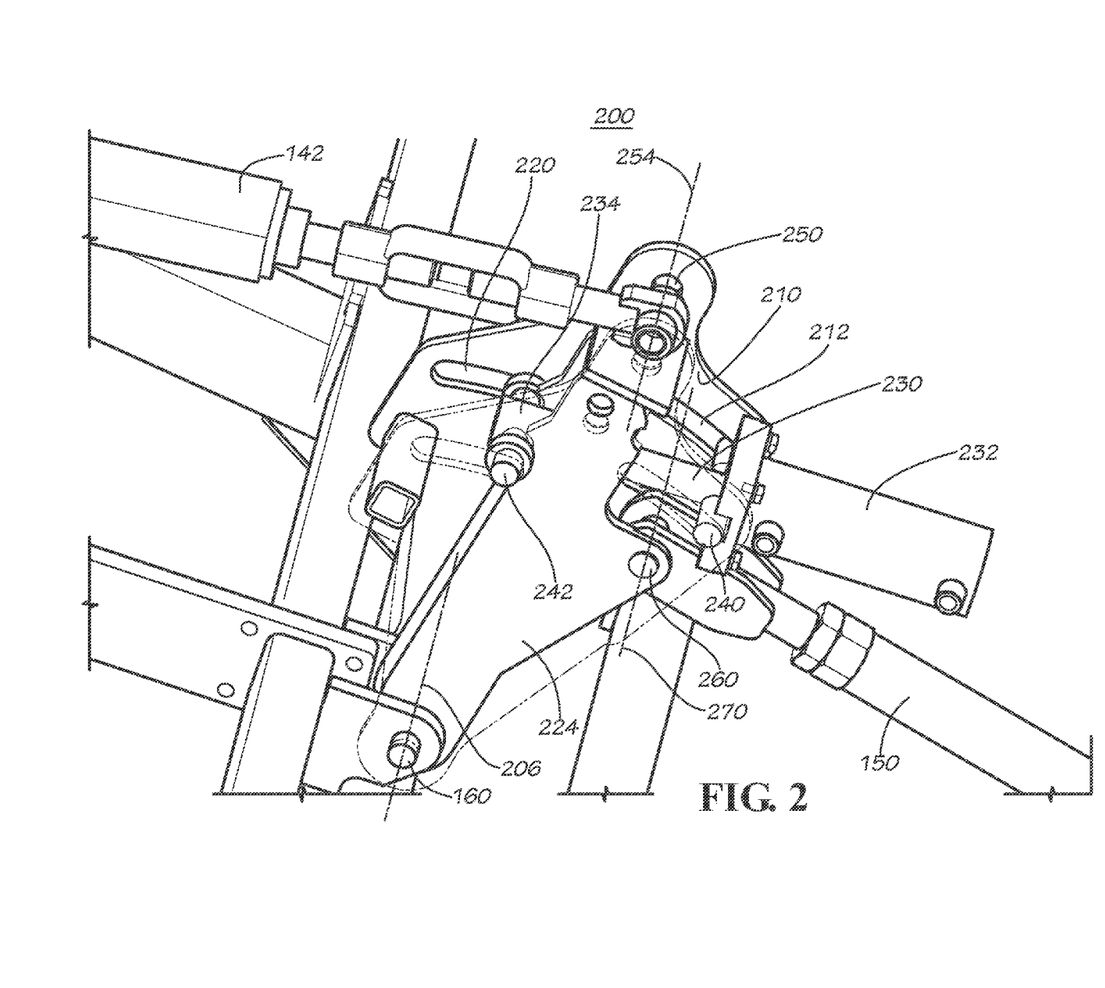
FIG. 2 is a partial exploded perspective view of a leveling arrangement in a floating mode.

FIG. 2 is a partial exploded perspective view of leveling arrangement 200 in a floating mode. Leveling arrangement 200 may be coupled to front cross-member 102 and/or tongue 120 at second pivot joint 160 and may be operative to move back and forth about a second pivot axis 206. Leveling arrangement 200 may comprise a first lever 210 comprising a first pivot limiter 212 and a second pivot limiter 220. Leveling arrangement 200 may comprise a second lever 224 situated substantially inside first lever 210. Leveling arrangement 200 may further comprise a locking actuator 230 comprising a plunger section 232 and a rod end section 234. Plunger section 232 may comprise a first pair of locking pins 240 operably coupled to first pivot limiter 212. Rod end section 234 may comprise a second pair of locking pins 242 operably coupled to second pivot limiter 220. First pivot limiter 212 and second pivot limiter 220 may each comprise a pair of motion-limiting radial slots.

Figure 3:
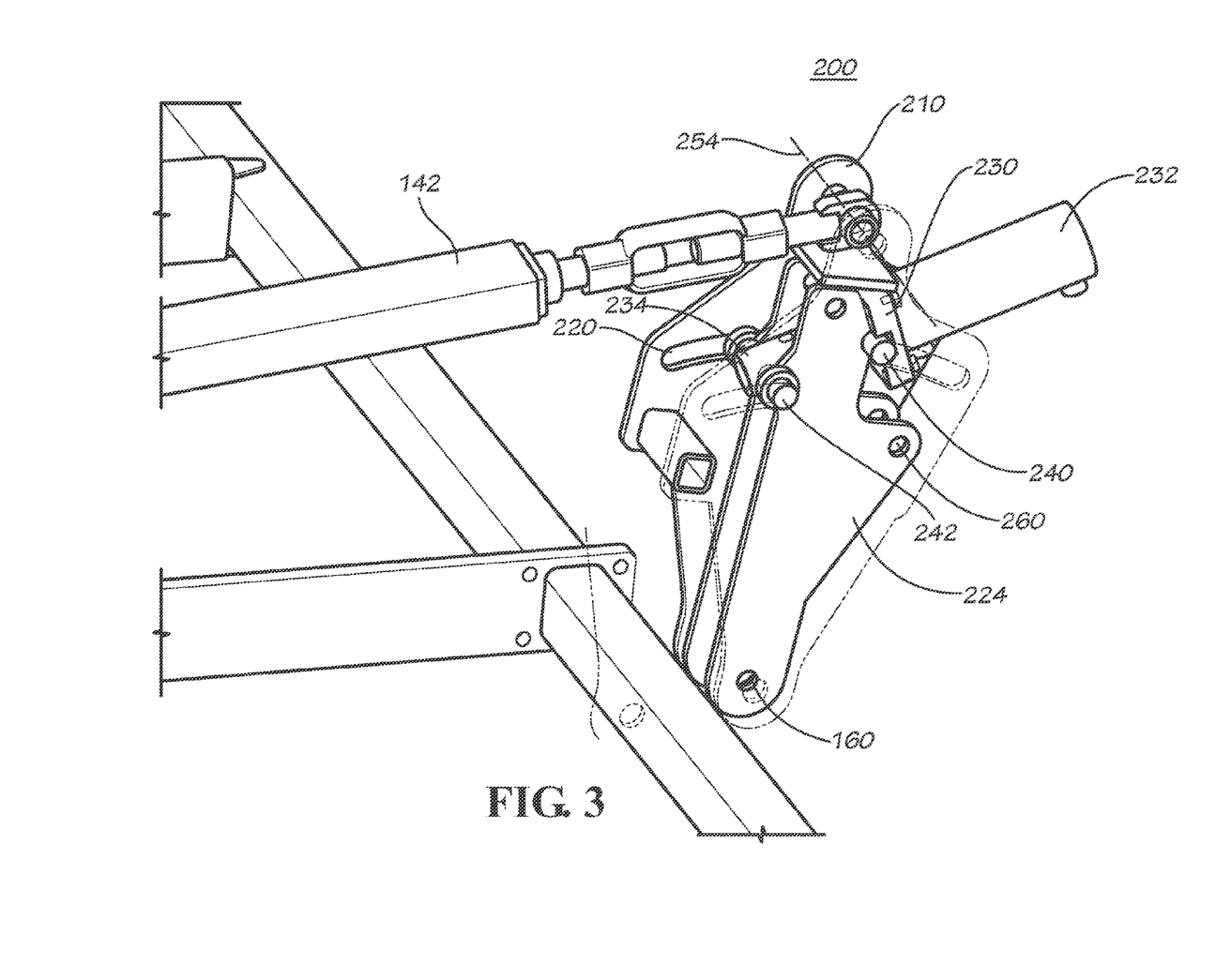
FIG. 3 is a partial exploded perspective view of the leveling arrangement of FIG. 3 in a locked mode.

Locking actuator 230 may be operative to extend from a fully retracted position, as illustrated in FIG. 3, to allow movement of the leveling arrangement about second pivot axis 206. Locking actuator 230 may be further operative to retract to a fully retracted position, as illustrated in FIG. 4, to prevent movement of leveling arrangement 200 about second pivot axis 206 and/or to prevent movement of tongue 120 about first pivot axis 128.

Leveling linkage 140 may be coupled to first lever 210 of leveling arrangement 200 at a third pivot joint 250 operable to allow pivoting movement about a third pivot axis 254. Consistent with embodiments of the invention, leveling linkage 140 may comprise an adjustable turnbuckle coupling to third pivot joint 250. Adjustable link 150 may be coupled to second lever 224 of leveling arrangement 200 at a fourth pivot joint 260 operable to allow pivoting movement about a fourth pivot axis 270. Slight pivoting motion may occur at second pivot joint 160 and/or third pivot joint 250 when tongue 120 is being coupled to one of attachment points 140(A)-(C) and/or implement 100 is being raised or lowered.

FIG. 3 is a partial exploded perspective view of leveling arrangement 200 in a locked mode. Locking actuator 230 is illustrated in a fully retracted position operable to enable a locked mode and prevent pivoting movement about second pivot joint 160.

Figure 4:
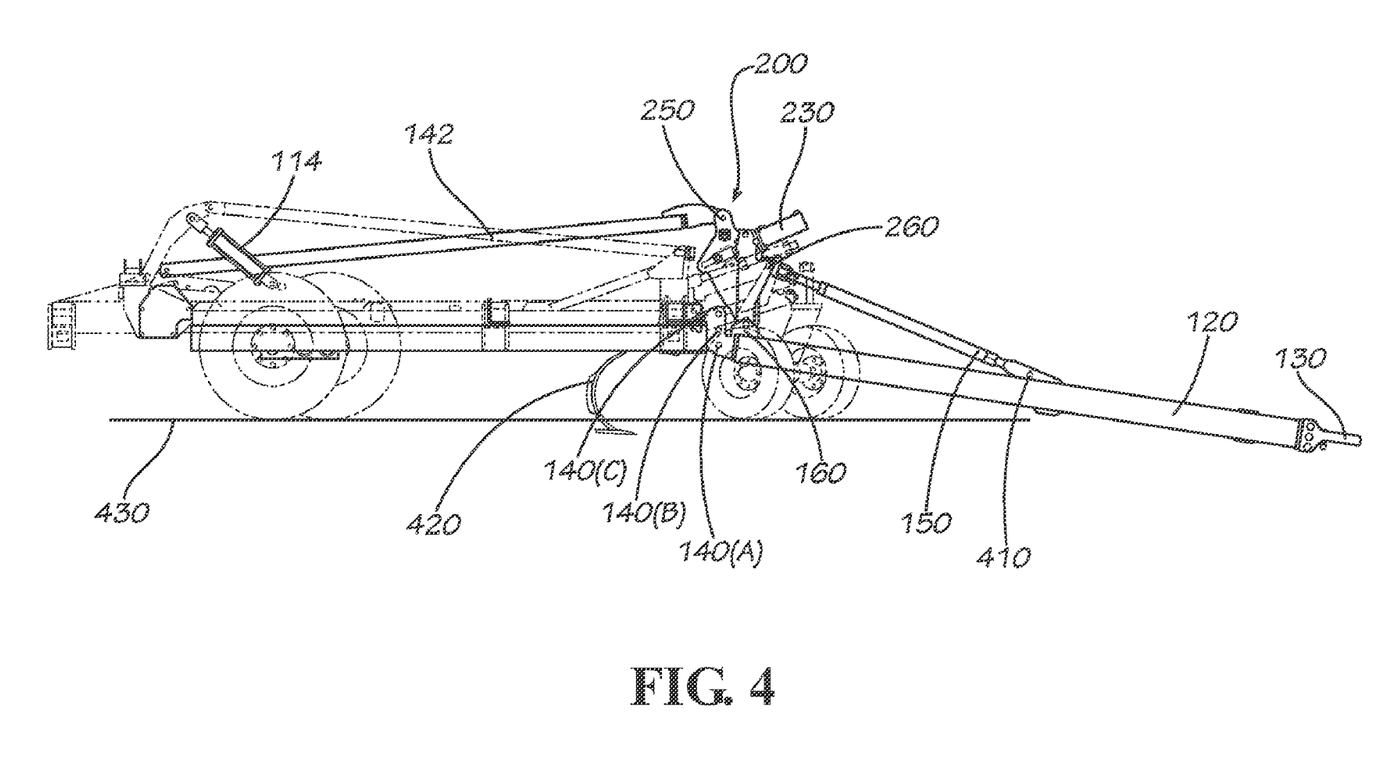
FIG. 4 is a left side elevation view of the pull-type implement of FIG. 1 in a lowered, working position with the leveling arrangement of FIG. 3 in the floating mode as the pull-type implement traverses uneven terrain.

FIG. 4 is a left side elevation view of implement 100 in a lowered, working position with leveling arrangement 200 in the floating mode as the pull-type implement traverses uneven terrain. For example, implement 100 may comprise a cultivator as it goes over a field rise. Adjustable link 150 may further comprise a fifth pivot joint 410 at a coupling between adjustable link 150 and tongue 120. Consistent with embodiments of the invention, fifth pivot joint 410 may be operative to pivot only when being manually adjusted with the screw thread. Implement 100 may further comprise a work tool 420, such as a cultivator blade. In the lowered, working position, work tool 420 may be engaged with a ground level 430 at a depth set by the depth control described above with respect to FIG. 1. By engaging the locking mode of leveling arrangement 200 while the in lowered, working position, additional stability may be provided to implement 100, for example, while a towing vehicle coupled at hitch 130 is performing a turn. Gauge wheel assemblies 180(A)-(B) may remain in contact with the ground during such an operation.

FIG. 5 is a left side elevation view of implement 100 in a lowered, working position with leveling arrangement 200 in a floating mode. The floating mode may allow a pivoting movement at first pivot joint 124 about first pivot axis 128 while maintaining work tool 420 at a constant depth.

FIG. 6 is a left side elevation view of implement 100 in a raised, transport position with leveling arrangement 200 in the locked mode. Gauge wheel assembly 180(A) and work tool 420 may be raised out of contact with ground level 430 for transport. The locked mode may prevent tongue 120 and the frame from pivoting about first pivot joint 124.

FIG. 7 is a perspective view of leveling arrangement 200 coupled to a pair of counterbalancing springs 710. Springs 710 may balance additional weight added to the rear of implement 100. Tightening the preload of springs 710 may add downward force to gauge wheel assemblies 180(A)-(B) and may aid in maintaining consistent cultivating depth front to rear. Springs 710 may also dampen pivoting movement about second pivot joint 160 and/or third pivot joint 250.

Figure 8:
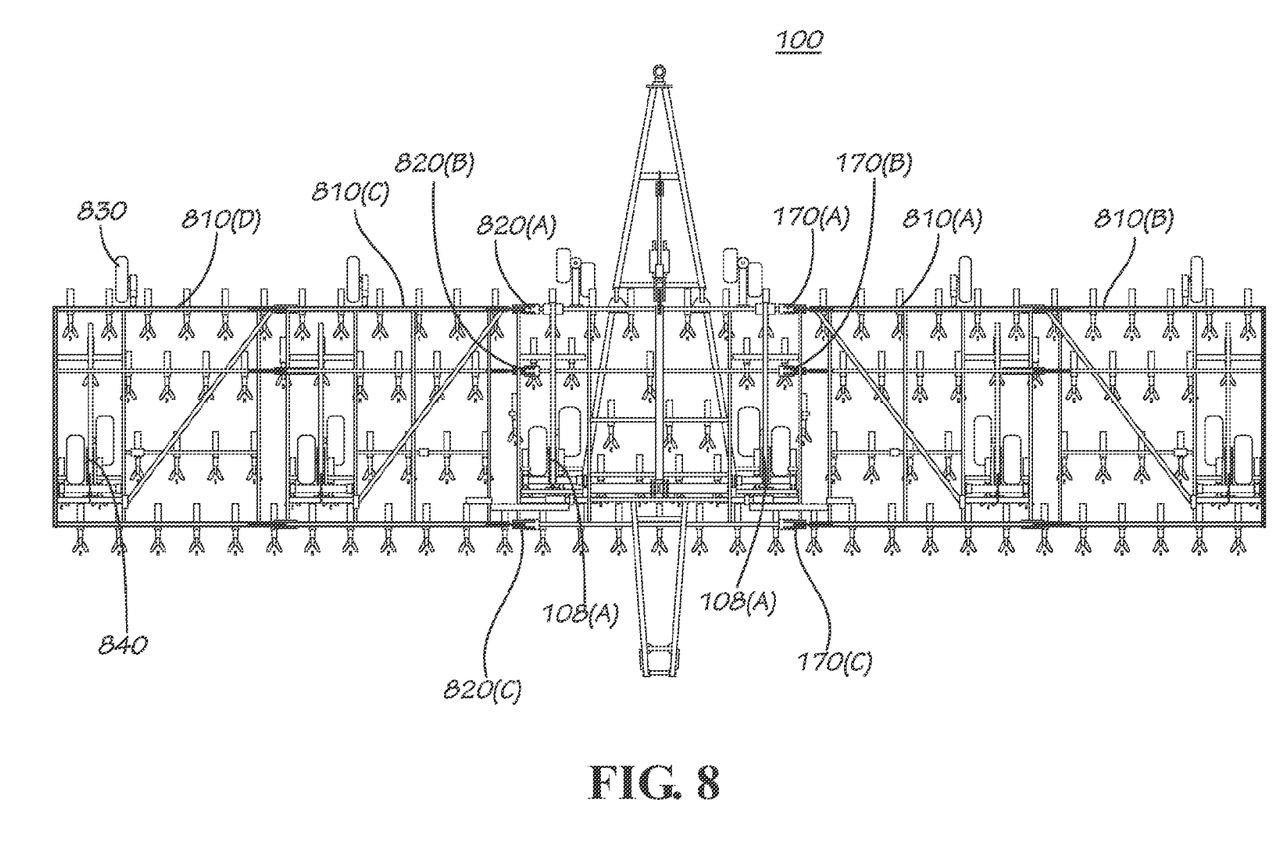
FIG. 8 is a top plan view of the pull-type implement of FIG. 1 coupled to a wing section.

FIG. 8 is a top plan view of pull-type implement 100 of FIG. 1 coupled to a plurality of wing sections 810(A)-(D). For example, implement 100 may comprise a pull-type implement comprising a 5-section cultivator and may comprise two pair of wings on each side of the frame (e.g., wing sections 810(A)-(B) on one side of the frame and wing sections 810 (C)-(D) on the opposite side of the frame.) One wing section (e.g., wing section 810(A)) may be coupled, for example, to attachment points 170(A)-(C) of frame rail 108(A). A second wing section (e.g., wing section 810(C)) may be coupled to a similar set of attachment points 820(A)-(C) of frame rail 108(B). Each of wing sections 810(A)-(D) may comprise at least one attached gauge wheel, such as a gauge wheel assembly 830, and a ground-engaging rear wheel assembly, such as a ground-engaging rear wheel 840. Consistent with embodiments of the invention, the wing pairs may be folded for transport by pivoting the wing pair about attachment points 170(A)-(C) into a vertical position.

Figure 9:
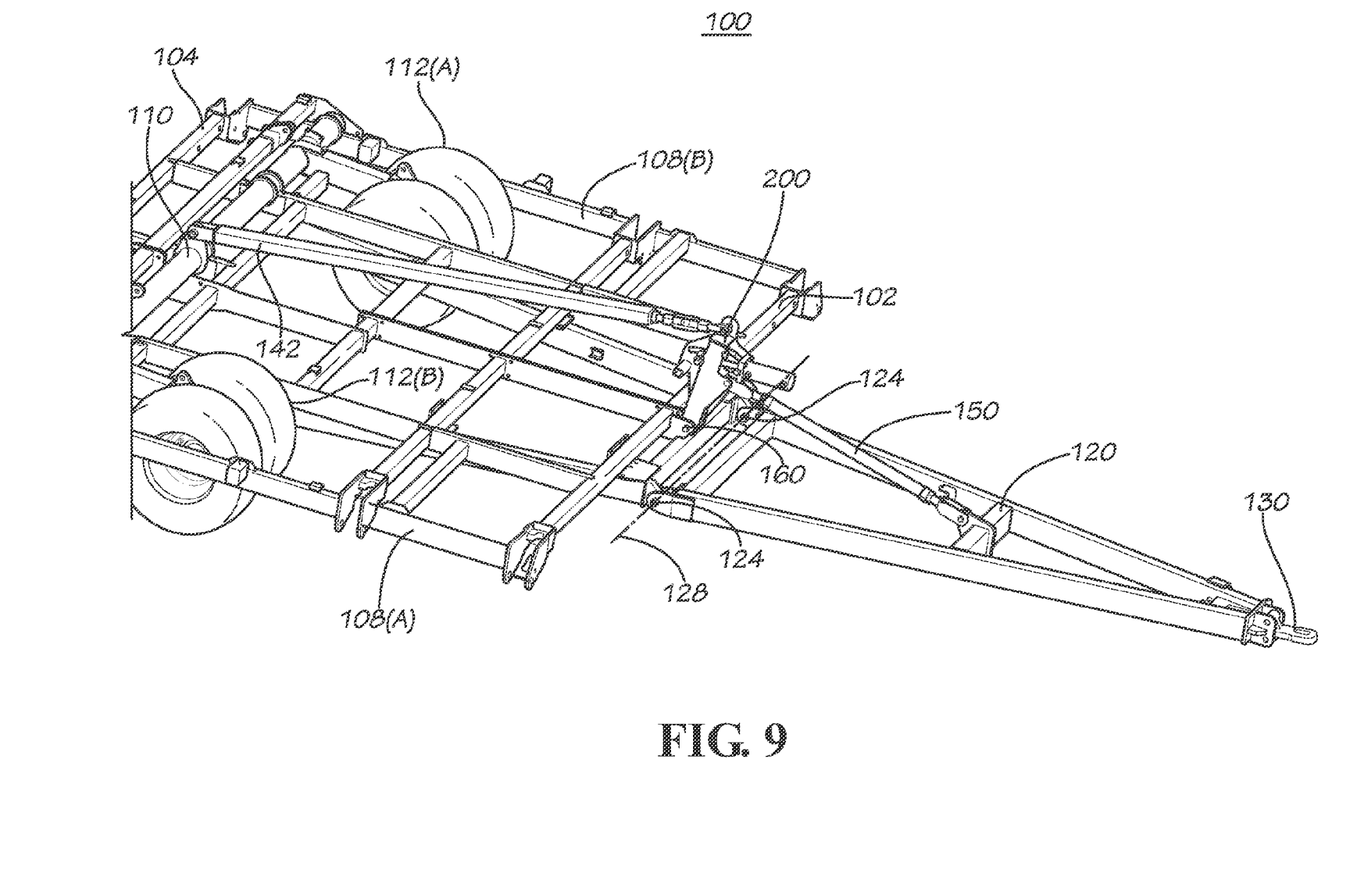
FIG. 9 is a perspective view of another embodiment of the pull-type implement.

FIG. 9 is a perspective view of another embodiment of pull-type implement 100. With the embodiment illustrated in FIG. 9, leveling arrangement 200 may be coupled to the implement frame at second pivot joint 160 rather than to tongue 120, as illustrated in FIG. 1. Adjustable link 150 may be coupled between leveling arrangement 200 and tongue 120 as described above.

Each of the pivot joints described above may comprise, for example, a mating pin passed through a pair of pivot holes in a fork an external member and an interior pivot hole in a tab of an internal member situated within the fork of the external member. A bushing may be placed around the mating pin to reduce the effects of wear. The bushing may comprise a hardened material, such as carbon steel, and may be used to protect a housing from premature wear resulting from friction with the mating pin.

While certain embodiments of the invention have been described, other embodiments may exist. While the specification may include examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A pull-type implement adapted for attachment to a towing vehicle, the pull-type implement comprising:
    a frame comprising a front cross-member, a rear cross-member positioned substantially parallel to the front cross-member, and at least two frame rails joining the front cross-member to the rear cross-member;
    a vertically adjustable rear wheel suspension rotatably mounted to the frame rails of the frame comprising a lift axle assembly and at least two laterally spaced ground-engaging wheels rotatably mounted to the lift axle assembly, the vertically adjustable rear wheel suspension further comprising at least one actuator operably connected to the lift axle assembly, wherein the actuator is configured to actuate the vertically adjustable rear wheel suspension to move the frame between a lowered, working position and a raised, transport position;
    a tongue coupled to the front cross-member via at least one pivot joint, wherein the at least one pivot joint is operative to allow vertical movement between the tongue and the frame about a first pivot axis;
    a leveling arrangement coupled to the front cross-member about a second pivot axis, the leveling arrangement comprising a first lever comprising a first pivot limiter and a second pivot limiter, a second lever, and a locking actuator comprising a first section operably coupled to the first pivot limiter and a second section operably coupled to the second pivot limiter, wherein the locking actuator is operative to extend from a fully retracted position to allow movement of the tongue about the first pivot axis, and wherein the locking actuator is further operative to retract to the fully retracted position to prevent movement of the tongue about the first pivot axis; and
    a leveling linkage coupled between the lift axle assembly of the vertically adjustable rear wheel suspension and the first lever of the leveling arrangement, wherein the leveling linkage is operative to maintain the frame in a substantially level orientation when the frame is being moved between the lowered, working position and the raised, transport position.

2. The pull-type implement of claim 1, wherein the second lever is operably coupled to the tongue via a adjustable link operative to pivot about a third pivot axis at a first end of the adjustable link and to pivot about a fourth pivot axis at a second end of the adjustable link.

3. The pull-type implement of claim 1, wherein the at least one actuator operably connected to the lift axle assembly comprises at least one hydraulic cylinder.

4. The pull-type implement of claim 1, wherein the locking actuator comprises a hydraulic cylinder.

5. The pull-type implement of claim 1, wherein the first pivot limiter comprises a pair of motion-limiting radial slots and wherein the first section of the locking actuator is operably coupled to the pair of motion limiting radial slots via a pair of pins adapted for mating with the first pair of motion-limiting radial slots.

6. The pull type-implement of claim 1, further comprising a front gauge wheel assembly, wherein the front gauge wheel assembly is operative to engage the ground when the frame is in the lowered, working position and wherein the front gauge wheel assembly is maintained out of engagement from the ground when the frame is in the raised, transport position.

7. The pull-type implement of claim 1, wherein at least one of the at least two frame rails is adapted to receive a wing section comprising an additional work implement.

8. The pull-type implement of claim 1, wherein the tongue is pivotally coupled to the front cross-member via at least two pivot joints operable to allow the frame and tongue to float according to changes in a ground terrain level about the first pivot axis.

9. A pull-type implement adapted for attachment to a towing vehicle, the pull-type implement comprising:
   a frame comprising a front cross-member, a rear cross-member positioned substantially parallel to the front cross-member, and at least two frame rails joining the front cross-member to the rear cross-member;
   a vertically adjustable rear wheel suspension rotatably mounted to the frame rails of the frame comprising a lift axle assembly and at least two laterally spaced ground-engaging wheels rotatably mounted to the lift axle assembly, the vertically adjustable rear wheel suspension further comprising at least one hydraulic cylinder operably connected to the lift axle assembly, wherein the hydraulic cylinder actuates the vertically adjustable rear wheel suspension and thereby moves the frame between a lowered, working position and a raised, transport position;
   a tongue coupled to the front cross-member via at least two pivot joints, wherein the at least two pivots joint are operative to allow a floating vertical movement between the tongue and the frame about a first pivot axis in response to changes in a ground level;
   a leveling arrangement coupled to the tongue about a second pivot axis, the leveling arrangement comprising a first lever comprising a first pivot limiter and a second pivot limiter, a second lever, and a locking actuator comprising a first section operably coupled to the first pivot limiter and a second section operably coupled to the second pivot limiter, wherein the locking actuator is operative to extend from a fully retracted position to allow movement of the tongue about the first pivot axis, and wherein the locking actuator is further operative to retract to the fully retracted position to prevent movement of the tongue about the first pivot axis;
   a leveling linkage coupled between the lift axle assembly of the vertically adjustable rear wheel suspension and the first lever of the leveling arrangement, wherein the leveling linkage is operative to maintain the frame in a substantially level orientation when the frame is being moved between the lowered, working position and the raised, transport position.

10. The pull-type implement of claim 9, wherein each of the at least two pivot joints coupling the tongue to the front cross-member are situated substantially equidistant from a respective joining of each of the at least two frame rails to the front cross-member.

11. The pull-type implement of claim 9, wherein each of the at least two pivot joints comprise a plurality of attachment points, and wherein the tongue is coupled to one of the plurality of attachment points to allow the frame to be coupled to the tongue in a substantially level position.

12. The pull-type implement of claim 9, further comprising at least two gauge wheel assemblies each mounted to the front cross-member of the frame, wherein each of the at least two gauge wheel assemblies are mounted substantially equidistant from a respective joining of each of the at least two frame rails to the front cross-member.

13. The pull-type implement of claim 9, wherein the at least two gauge wheel assemblies are operative to engage the ground when the frame is in the lowered, working position and wherein the front gauge wheel assembly is maintained out of engagement from the ground when the frame is in the raised, transport position.

14. The pull-type implement of claim 9, further comprising a spring counterbalance coupled to the leveling arrangement.

15. The pull-type implement of claim 9, further comprising a hydraulic depth control valve comprising an actuator operative to control a depth of penetration into the ground of at least one work tool coupled to the pull-type implement.

16. The pull-type implement of claim 9, wherein the leveling linkage is coupled to the vertically adjustable rear wheel suspension via a third pivot joint.

17. The pull-type implement of claim 16, wherein the third pivot joint comprises a hardened bushing.

18. The pull-type implement of claim 9, wherein the second lever is further coupled to the tongue via a adjustable link operative to pivot about a fourth pivot joint at a first end of the adjustable link coupled to the second lever and to pivot about a fifth pivot joint at a second end of the adjustable link coupled to the tongue.

19. The pull-type implement of claim 9, wherein the at least two pivot joints are operative to allow a maximum of plus or minus eleven degrees of floating vertical movement.

20. A method for pulling an implement behind a tractor, the method comprising:
   mounting a hitch-tongue structure comprising a mounting bracket adjacent to a first end of the hitch-tongue structure to a tractor;
   attaching a second end of the hitch-tongue structure to at least one of a plurality of attachment points of a work implement frame, wherein the at least one of the plurality of attachment points is operative to allow a floating vertical movement about a first pivot axis between the hitch-tongue structure and the work implement frame, and wherein the work implement frame comprises a first cross-member, a second cross-member, at least two outside rails for joining the first cross-member and the second cross-member, and a vertically adjustable rear wheel suspension rotatably mounted to the at least two frame rails of the frame, wherein the vertically adjustable rear wheel suspension comprises a lift axle assembly and at least two laterally spaced ground-engaging wheels rotatably mounted to the lift axle assembly;
   coupling a leveling arrangement comprising a first lever, a second lever arranged substantially inside the first lever, and a locking actuator to the hitch-tongue structure about a second pivot axis, wherein the first lever comprises a first pivot limiter and a second pivot limiter, wherein the locking actuator comprises a first section operably coupled to the first pivot limiter and a second section operably coupled to the second pivot limiter;
   coupling a leveling linkage between the lift axle assembly of the vertically adjustable rear wheel suspension and the first lever of the leveling arrangement;
   actuating at least one hydraulic cylinder operably connected to the lift axle assembly to thereby move the work implement frame from a lowered, working position and a raised, transport position;
   maintaining the work implement frame in a substantially level orientation when the frame is being moved from the lowered, working position and the raised, transport position via the leveling linkage; and retracting the locking actuator to a fully retracted position to prevent the floating vertical movement of the hitch-tongue structure and the work implement frame about the first pivot axis, wherein the locking actuator is further operative to extend from the fully retracted position to allow the floating vertical movement of the hitch-tongue structure and the work implement frame about the first pivot axis.

* * * * *